(12) United States Patent
Garabedian

(10) Patent No.: US 6,687,637 B2
(45) Date of Patent: Feb. 3, 2004

(54) DATA SENSOR VALIDATION SYSTEM AND METHOD

(75) Inventor: Arminch Garabedian, Montreal (CA)

(73) Assignee: GlobVision Inc., Montreal (CA)

( * ) Notice: Subject to any disclaimer, the term of this patent is extended or adjusted under 35 U.S.C. 154(b) by 0 days.

(21) Appl. No.: 10/173,267

(22) Filed: Jun. 18, 2002

(65) Prior Publication Data

US 2003/0097230 A1 May 22, 2003

Related U.S. Application Data

(60) Provisional application No. 60/298,406, filed on Jun. 18, 2001.

(51) Int. Cl.[7] ................................................. G06F 1/04
(52) U.S. Cl. ....................... 702/107; 706/26; 342/41; 701/3
(58) Field of Search ........................... 702/107; 706/20; 342/41, 59, 357.09; 701/301, 21, 275; 455/456.5

(56) References Cited

U.S. PATENT DOCUMENTS 6,249,241 B1 * 6/2001 Jordan et al. ................. 342/41
6,496,813 B1 * 12/2002 Labreche et al. ............. 706/20
6,611,737 B1 * 8/2003 El-Tahan et al. ............. 701/21

* cited by examiner

Primary Examiner—Kamini Shah
(74) Attorney, Agent, or Firm—Freedman & Associates

(57) ABSTRACT

A method of data sensor validation is disclosed. The method comprises the steps of pre-processing data sensor from each sensor from a plurality of sensors for at least segmenting the data sensors into a plurality of groups, each group for grouping sensors for sensing highly relevant data one to another; providing the pre-processed data sensor to a correlation processor, the correlation processor for determining from pre-processed data sensor, pre-processed data that is other than correlated, the determination made in dependence upon redundant pre-processed data other than pre-processed data from two sensors for sensing an identical parameter; and, when pre-processed data that is other than correlated is detected, providing an indication to an operator that the sensor data is other than correlated. Advantageously the method is applicable for use in geographically remote sensor applications wherein the sensors are adapted to provide geographic location information using a global positioning system to the correlation processor through wireless communication with satellites.

30 Claims, 5 Drawing Sheets

DATA SENSOR VALIDATION SYSTEM AND METHOD

This application claims priority from the U.S. Provisional Application Ser. No.: 60/298,406 filed Jun. 18, 2001.

FIELD OF THE INVENTION

The invention relates generally to data sensor validation and more particularly to a method of data sensor validation for use in environmental applications.

BACKGROUND OF THE INVENTION

A neural network is an artificial neural circuit network that, either in circuitry or in software, performs correlation processing. In a typical neural network, there is one or more intermediate layers between a data input layer and a data output layer, each of these layers being made up of a plurality of units, network-like connections being made between the input/output sections and the intermediate layers by means of the input/output systems. Because this neural network has non-linear components, it is capable of performing extremely complex correlations with respect to a variety of data types. These correlations are then useful in determining approximations, projections, and so forth. Because of this, neural networks are currently used in many industries, including manufacturing and service industries.

In these industries, a neural network is selected for a particular process and is then trained using known input data and known output responses. For example, in a process control circuit, a neural network is trained to provide a desired process control signal in response to a plurality of sensor data received at an input port thereof. Through training, weights within the neural network are modified to ensure that each sensor input value is appropriately accounted for in the control signal provided at the output of the neural network. Of course, some neural networks are manufactured with their weights integrated therein when their use is known and fixed.

Conventional neural network training and testing methods require complete patterns such that they are required to discard patterns with missing or bad data. Experimental results have shown that neural network testing performance generally increases with more training data when trained.

Most methods of training and using neural networks do not account for the relationship between measurements by one sensor relative to another sensor measurement in unrelated systems. Often, in conjunction with increasing the reliability of measurement data, fault detection techniques such as sensor redundancy are used to increase a control system's ability to recognize that measurement data is unreliable. If measurement data from a sensor in a group of redundant sensors is inconsistent with measurement data from other sensors in the group, the inconsistent data is considered as unreliable and are ignore.

Data sensor validation is an important part of feedback based control systems and of large scale monitoring systems. In data sensor validation, data from each of a plurality of sensors is validated to avoid decisions or monitoring being dependent upon erroneous sensor data. Effective detection of erroneous measurements and recovery of missing data are important as erroneous or missing data may disrupt operations and may cause severely abnormal operating conditions and result in incorrect safety, control, and economic decisions.

When a neural network is trained, weighting coefficients and biases are randomly applied with respect to the input data for each of units that accepts data. As data is input under these conditions, judgments are made with regard to the correctness of the output resulting from calculation according to these weighting coefficients. Whether or not the output results are correct is fed back using a learning method such as back-propagation, the originally set weighting coefficients and biases being corrected, and data being re-input. By repeating this process of input and correction of weighting coefficients and biases a large number of times, the weighting coefficients and biases that will obtain an appropriate output for a prescribed data input are established.

By installing a trained neural network into character recognition, image processing or other system that is implemented by a computer, the neural network can be put into practical use in many industries, including manufacturing and service industries. These neural networks are used in closed environments wherein the sensors sense known parameters as for example the amount of carbon monoxide or other gases along a manufacturing process. Such a restricted environment facilitates the identification and the replacement or repair/adjustment/calibration of a faulty sensor when erroneous data are sensed.

Conversely, when considering large-scale neural network, i.e. open field control system, it is important to precisely point out which sensor is deficient when erroneous data are received at a control operating system. Since in an open field neural network the sensors are remotely located, sending a technician to an isolated remote location for replacing a faulty sensor is an expensive process that most organizations tend to avoid if the faulty sensor is not precisely identified.

Furthermore, a major problem with existing validation system using neural network is when a sensor data is close to an extreme value—lower or upper—within or outside a pre-determined range of values, the sensor data is attributed a value corresponding to an extreme value, without consideration of the real value of the sensor data validation of the sensor data. Therefore, the attributed value is not representative of an event occurring at the sensor, there is no indication to which extreme the sensed value is close to.

It would be advantageous to provide a method of validating data that is improved over the data limit approach but not as costly to implement as the duplicate sensor approach.

Furthermore, it would be advantageous to provide a method for suggesting a value for replacing a sensed data, which shows a shift from a predictable sensed data.

OBJECT OF THE INVENTION

It is another object of the present invention to provide a method for verifying the validity of sensor data for use in environmental type applications.

SUMMARY OF THE INVENTION

In accordance with the invention there is provided a method of data sensor validation comprising the steps of: pre-processing data sensor from each sensor from a plurality of sensors for at least segmenting the data sensors into a plurality of groups, each group for grouping sensors for sensing highly relevant data one to another; providing the pre-processed data sensor to a correlation processor, the correlation processor for determining from pre-processed data sensor, pre-processed data that is other than correlated, the determination made in dependence upon redundant pre-processed data other than pre-processed data from two sensors for sensing an identical parameter; and, when pre-processed data that is other than correlated is detected, providing an indication to an operator that the sensor data is other than correlated.

In accordance with the invention there is provided a method of data sensor validation comprising the steps of: pre-processing data sensor from each sensor from a plurality of sensors; providing the pre-processed data sensor to a correlation processor, the correlation processor for determining from pre-processed data sensor, pre-processed data that is other than correlated, the determination made in dependence upon redundant pre-processed data other than pre-processed data from two sensors for sensing an identical parameter; and, when pre-processed data that is other than correlated is detected, providing an indication to an operator that the sensor data is other than correlated.

In accordance with the invention there is provided a sensor for use in geographically remote sensor applications comprising a sensing circuitry for sensing data; a transmitter for transmitting sensed data to a correlation processor, the correlation processor for determining from pre-processed sensed data, pre-processed data that is other than correlated, the determination made in dependence upon redundant pre-processed data other than pre-processed data from two sensors for sensing an identical parameter at an approximately same geographic location; a wireless transceiver circuit for wirelessly determining a geographic location of the sensor, for transmitting the determined geographic location of the sensor to the correlation processor, and for transmitting the sensed data to the correlation processor for allowing the correlation processor to associate the received sensed data with the determined geographic location.

DESCRIPTION OF THE DRAWINGS

Exemplary embodiments of the invention will now be described in conjunction with the following drawings, in which similar reference numbers designate similar items.

DESCRIPTION OF THE INVENTION

The method is described below with reference to water flow sensors though it to applicable to any environmental or distributed system with correlation between different sensed values.

Figure 1:
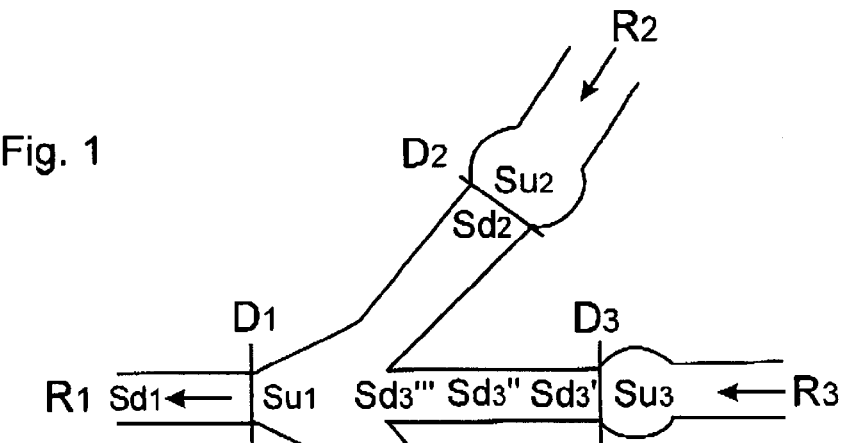
FIG. 1 is an example of an open field sensors organization according to an embodiment of the present invention.

Referring to FIG. 1, a hydraulic network is illustrated showing four rivers $R_1-R_4$, wherein three rivers $R_2$, $R_3$ and $R_4$ are confluent to river $R_1$, and a dam $D_1$ regulates the water flow from $R_2$, $R_3$ and $R_4$ toward $R_1$. Similarly, each of the rivers $R_2$, $R_3$ and $R_4$ has a water flow regulator in a form of a dam $D_2$, $D_3$ and $D_4$, respectively, upstream the dam $D_1$. Each dam is equipped with generator sensors for sensing for example the amount of electricity generated according to an opening of the gates of each gate of the dam. Each river is equipped with sensors $S_1-S_4$, respectively, such as upstream $Su_1-Su_4$, downstream $Sd_1-Sd_4$ water level sensors, and flow rate sensors, sensor for sensing chemical composition of water, power output sensors and other sensors. Such a system for regulating flow rate or water distribution is known and conventionally used. However, based upon data sensed at a dam, a decision is made and an action is taken accordingly by an operator. Therefore, when the operator does not react properly in an objective sense to the actual events, the consequences are potentially catastrophic. For example, when sensors sense a dam overflow of a dam located a few kilometers from a city, it is too late to counteract to prevent inundations in the city.

Conventionally, the sensors are sensors available on the market and are manually installed at the various location from which data are potentially interesting to sensed, for example at the top of the dam for sensing an over flowing or downstream the dam for sensing a water level for example at this specific location. Of course, because of the use of sensors for building neural networks of such a large scale, the number of sensors used is also extremely large. Advantageously, the use of enough sensors provides a lot of information for training the neural network and eventually allows for compensating for failure of some sensors. Advantageously, when enough sensors are in use, the trained correlation system operates with a substantial amount of redundant information, though perhaps not evidently so, and each sensor is required in order to avoid "guessing" that normal operation is occurring. When a sensor fails, the ability to correlate the redundant information received from other sensors that are not same sensors as the failed sensor allows for accurate estimation of the failed sensor's proper sensed data.

Data sensed from the sensors located on each rivers of the hydraulic network are gathered, computerized, organized, cross-referenced during a period of time long enough to ascertain the validity of the data sensed and therefore the validity of the sensors. Correlation between data sensed from each of the sensors $Su_1-Su_4$ and $Sd_1-Sd_4$ are established to train the neural network to make short-term predictions for missing data, to evaluate events and to identify invalid data. The trained neural network is also useful for studying complex relationships between sensors that are pseudo-redundant.

If different water level sensors $Sd_3'$, $Sd_3''$ and $Sd_3'''$ measure water levels within river $R_3$ as shown in FIG. 1 for example, the rising of the water level at first sensor $Sd_3'$ will result in a rising of the water level at the second sensor $Sd_3''$ after a known period of time has elapsed, which will result in a rising of the water level at the third sensor $Sd_3'''$ after another known period of time has elapsed.

Figure 2:
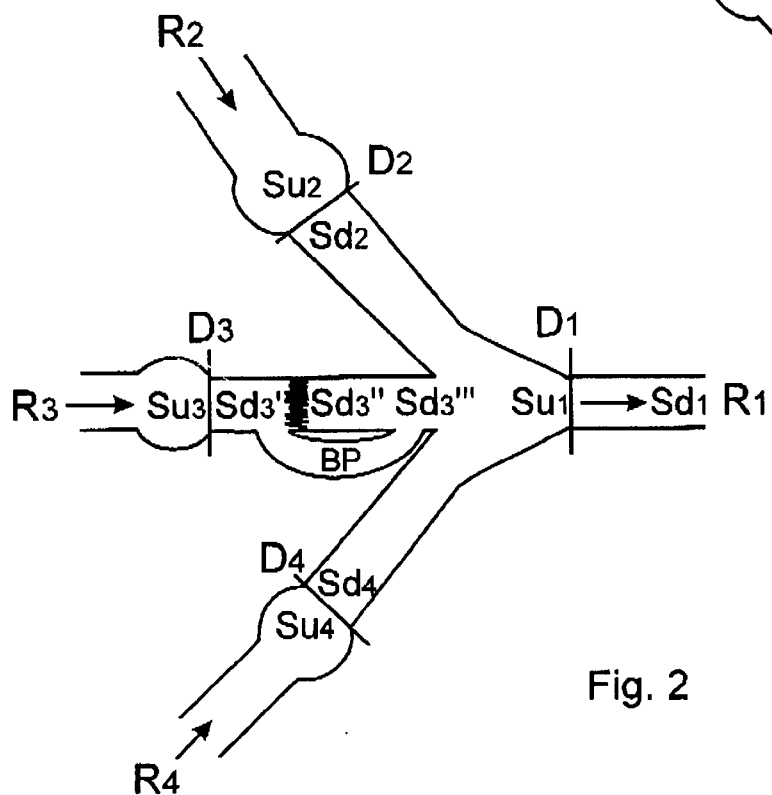
FIG. 2 is an example of an event, which modifies sensor readings in cascade.

In an event of sensor failure, the knowledge of regularities in mutual sensor dependencies is used to predict correct data for the failed sensor without relying on sensor duplication—two sensors for sensing an exact same parameter at an approximately same location and time. Referring to FIG. 2, an example of an event that modifies the regular flow of river $R_3$ is shown. The second sensor $Sd_3''$ does not indicate a risen water level whereas the third downstream sensor $Sd_3'''$ does, then it is evident that either the second sensor was bypassed—another branch BP of the river exists between the first sensor $Sd_3'$ and the third sensor $Sd_3'''$—or that the second sensor $Sd_3''$ is failed. Though this example is very simple, a correlation processor in the form of a neural network could process much more complicated relationships. In the above example, rain sensors, temperature sensors, ground water level sensors, water flow speed sensors; chemical sensors for water chemical content and so forth can be incorporated in order to enhance the correlation between sensor output values.

Optionally, the sensors are equipped with wireless communication transmitter for communicating with satellite for example. Such a communication system allows the sensors to be precisely localized using a Global Positioning System (GPS) transmitting the information to the neural network. Therefore, as soon as a sensor is installed, it begins to sense and transmit data to a control system of the neural network, which knows exactly where the received data come from.

To prevent potential disasters and to prevent actions based on erroneous data due to a faulty sensor, the sensor system is organized to form a correlation processor in the form for example of a neural network. Advantageously, data from each sensor are extracted and pre-processed during a data mining process, which is defined as a nontrivial extraction of implicit, previously unknown, and potentially useful information from data. The data mining process consists of two major parts namely a training process and a testing process.

During the training process two models, i.e. a prediction model and a regression models are created. The purpose of the prediction model is to fill in missing data both during the training phase and during the testing phase prior to using the data in the regression model. The regression model restores the missing data and validates existing data. Both the regression model and prediction models are prepared iteratively in the training process. Once they are created for the training process they are used for the training process.

Optionally, the prediction model is not performed during the training process.

Figure 3:
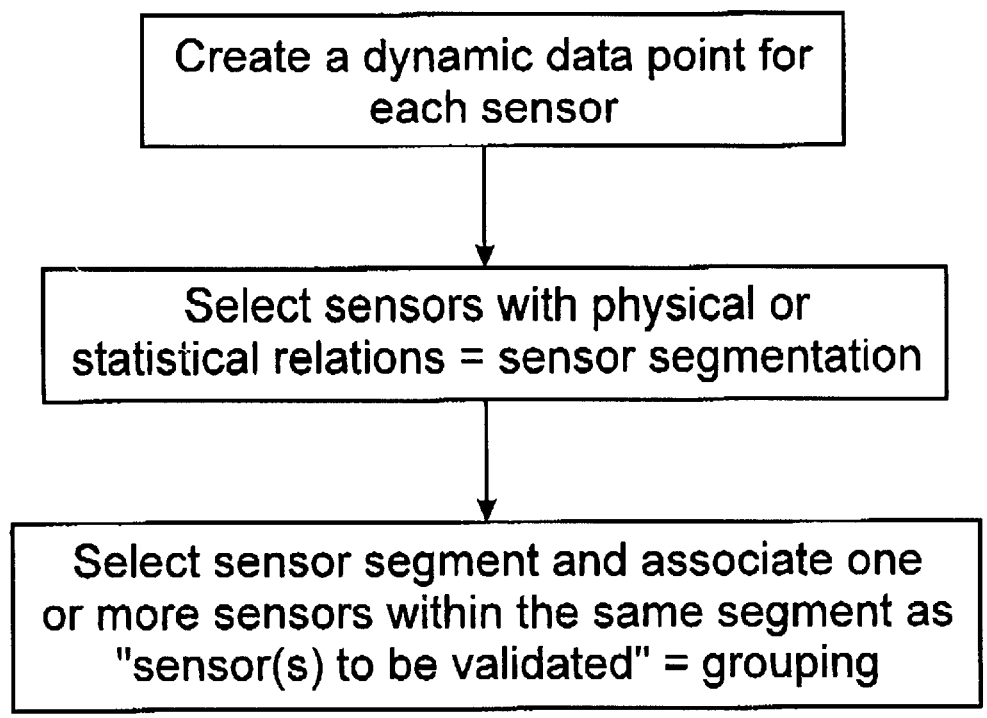
FIG. 3 is a flow chart diagram of a method of grouping sensors.

Referring to FIG. 3, a flow chart diagram of a method of grouping sensors is shown. A neural network is composed of a number of interconnected units each comprising an input and an output. The output of each unit is determined by its input/output characteristic, its interconnection to other units, and eventually its interconnection to external inputs. The network usually develops an overall functionality through one or more forms of training. Supervised learning neural network has been used for developing the data mining process. In supervised learning a set of typical input/output mappings forms a database-denoted training set, which provides significant information on how to associate input data with outputs. The training set is referred to as segments.

The knowledge required to map input pattern into an appropriate output pattern is embedded in the connection weights inside the neural network. Initially the weights are unknown. Until a set of applicable weights is found the network has no ability to deal with the problem to be solved. A dynamic data point (DDP) for referring to data from each sensor maintains database connection information for any given sensor, i.e. data base server name, table name and column name. A dynamic data point is a relation between a physical sensor and a location of data within a database. Therefore DDPs are preferably created for all sensors. Sensors with physical or statistical relations are selected and grouped; the outcome of this selection is referred to as sensor segmentation. Of course, for large sensor systems, hierarchical segmentation is possible and often preferred. Grouping of sensors is achieved by selecting a sensor segment with one or more sensors from this sensor segment, for the purpose of validation.

The resulting application provides assistance for performing and achieving data quality assurance, i.e. data/sensor validation. Optionally, sensors are strategically installed over an area under surveillance, and the sensors wirelessly communicate with a satellite the sensed data to be transmitted at intervals through a neural network. Using a Geographic Information Systems (GIS) or a GPS interface allows for tracking of sensors, which improves the identification of redundant data sensors. For example, sensors sensing similar locations are more likely to sense redundant information. As such, grouping of sensors based on geography is a powerful tool. Using a GIS interface, allows for organization of sensors into groups relating to their proximity and similarity. The groups are then organized into larger groups and so forth. Thus, the system provides a powerful tool to facilitate training of the correlation processor. Also, using a GIS interface improves the correlation processor's ability to adapt and improve over time in response to environmental changes and constraints.

Figure 4A:
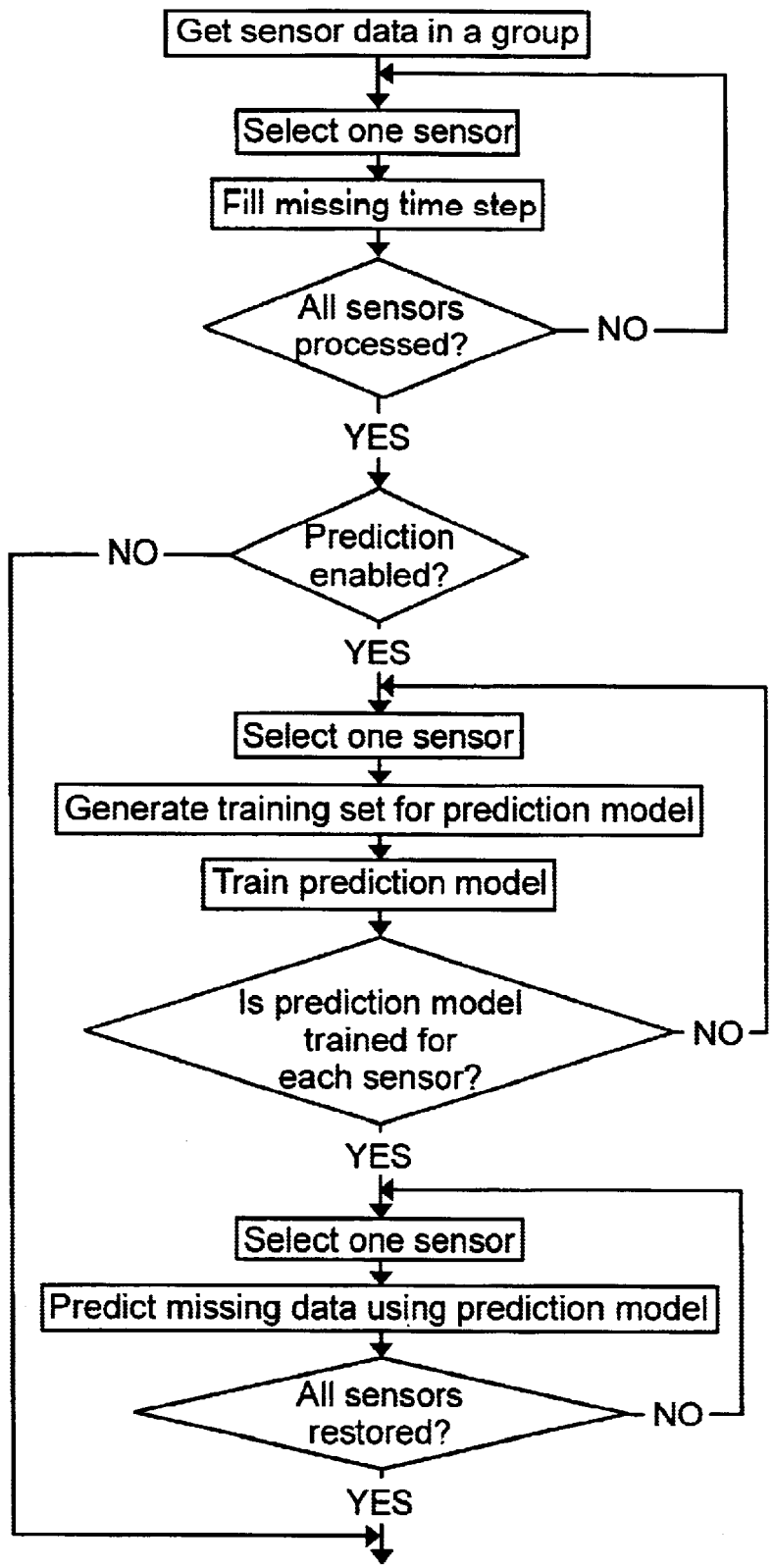
FIGS. 4a and 4b illustrate a flow chart diagram of a method of pre-processing sensor data according to the present invention.
Figure 4B:
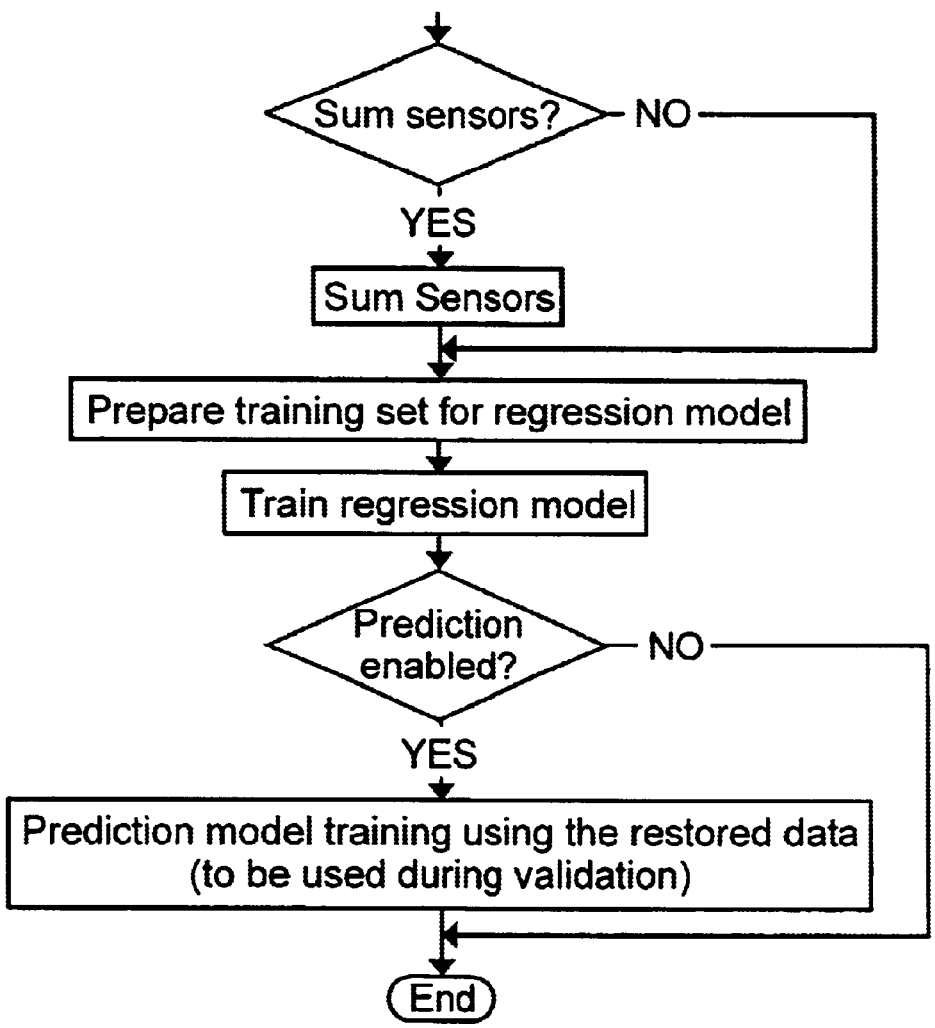

Referring to FIGS. 4a and 4b, a method of training a neural network is shown. For each group of sensors as defined in FIG. 3, data are read. For each sensor records appropriate time steps are used to fill in missing data with the values −1, which is the number used to represent missing values. Depending upon the type of data, as for example an underflow or an overflow, with corresponding values of missing data based on historical data. When a prediction model is used during the training process, for each sensor a separate prediction model is prepared using historical data.

The following table, table 1, is an example of the preparation of input and output patterns from one sensor. Segments corresponding to set of continuous data that do not contain any missing values are created. A size of each segment is preferably greater than a pre-determined number of data sensed within a predetermined period of time, which represents a delay, plus one data. A moving average over all individual segments is performed provided the segment size is greater than twice the pre-determined of data sensed within a predetermined period of time. An input and output for each segment is prepared provided the segment size is greater than twice the pre-determined number of data sensed within a predetermined period of time. An input and output pattern is prepared from each segment and merged together to form what is referred to as the training input and output pattern for the prediction model.

In the example illustrated in table 1, the delay is 4. Segment 2 has more than 4 values (delay) plus one value; therefore segment 2 was created. However, segment 2 is ignored in preparing the input and output pattern because its size is less than two delays.

TABLE 1

| Segment | Data | | Input-Output pairs | Input | | | | Output |
|---|---|---|---|---|---|---|---|---|
| Segment-1 | 1-8 | | Input-Output pair generated From Segment-1 | 1 | 2 | 3 | 4 | 5 |
| | | | | 2 | 3 | 4 | 5 | 6 |
| | | | | 3 | 4 | 5 | 6 | 7 |
| | | | | 4 | 5 | 6 | 7 | 8 |
| | -1 | | | 20 | 21 | 22 | 23 | 24 |
| Segment-2 | 11-16 | | | 21 | 22 | 23 | 24 | 25 |
| | | | | 22 | 23 | 24 | 25 | 26 |
| | | | | 23 | 24 | 25 | 26 | 27 |
| | | | | 24 | 25 | 26 | 27 | 28 |
| | -1 | | | 29 | 30 | 31 | 32 | 33 |
| Segment-3 | 20-45 | | Input-Output pair generated From Segment-3 | 30 | 31 | 32 | 33 | 34 |
| | | | | 31 | 32 | 33 | 34 | 35 |
| | | | | 32 | 33 | 34 | 35 | 36 |
| | | | | 33 | 34 | 35 | 36 | 37 |
| | | | | 34 | 35 | 36 | 37 | 38 |
| | | | | 35 | 36 | 37 | 38 | 39 |
| | | | | 36 | 37 | 38 | 39 | 40 |
| | | | | 37 | 38 | 39 | 40 | 41 |
| | | | | 38 | 39 | 40 | 41 | 42 |
| | | | | 39 | 40 | 41 | 42 | 43 |
| | | | | 40 | 41 | 42 | 43 | 44 |

Of course, each input-output pair is preferentially from the same segment.

The prediction model is trained, allowing for useful connection weights to be obtained through iterative learning. Typically, the connection weights are stored and represent a prediction model. The iteration stops either when acceptable minimum mean square error is achieved between predicted output values and known output values or when a predetermined maximum number of iterations of the training process are reached.

The prediction model is used to fill in missing data in each sensor prior to using them to prepare the regression model. Only input data are pre-processed and the prediction model provides with the output, which replaces the missing value. Referring back to the Table, for example, in order to fill in the first missing value (delay) on the ninth raw, values just preceding the missing values are used as input data and submitted to the prediction model, the prediction model then provides an output that replaces the value −1.

In the process of replacing missing values, some criteria exist, and the percentage of appearance of a missing data, in one of the sensor data, is a useful parameter. For example, if it is less than 30%, the prediction model restores the data without warning and the consequent process continues. If it is comprised of between 30% and 60%, the prediction model fills the missing data and the process continues, the operator is nonetheless warned regarding this high percentage of missing data. However, if it is greater than 60% nothing is done and the operator is notified.

All sensors measurements are scanned and n delay continuous measures are found. During pre-processing, data are then smoothed using moving average techniques. The training input data and desired output data are generated for the regression model. Input/output patterns are prepared from each group of sensors. The input pattern contains all the sensor readings in the group and the output pattern contains the sensor to be validated.

Generating a regression model involves the step of preparing from each sensor, input and output patterns to create segments, i.e. sets of continuous sets of data that do not contain any missing values. A size of each segment is preferably greater than a pre-determined number of data sensed within a predetermined period of time, which represents a delay, plus one data. A moving average over all segments is individually calculated, provided the segment size is greater than twice the time required to predict a missing value. The input pattern and output pattern are prepared for each segment, provided the segment size is greater than twice the time required to predict a missing value. Then, from each segment the input pattern and output pattern are prepared and merged together to form the training input and output pattern for the regression model. Each input-output pair is preferably from the same segment.

Alternatively, when data each sensor records individually does not provide more information to the neural network learning process then it is often efficient to work on a sum of similar type sensor records. Thus similar sensor data of a corresponding time step are added together and the neural network is trained based on the cumulative data. Summing sensor data is preferably only performed for the regression model.

The regression model is trained—useful connection weights are obtained through an iterative training process. Typically, the connection weights are stored and they, as a group, represent the regression model. The iteration of the training process stops either when acceptable minimum mean square error is achieved between known output data and predicted data or when a predetermined number of iterations have been performed.

A neural network using cross validation is created when available, and the neural network prediction is trained for each sensor and the weights for each sensor are saved. Furthermore, the neural network regression for the segment of sensors is also trained and the weights for the segment of sensors are saved.

The last step of the training process consists in recreating the prediction models based on the restored data; a restored data represent sensor data whose missing values are filled by the prediction model. This is achieved in order to get a fine-tuned prediction model usable during the testing process.

Figure 5:
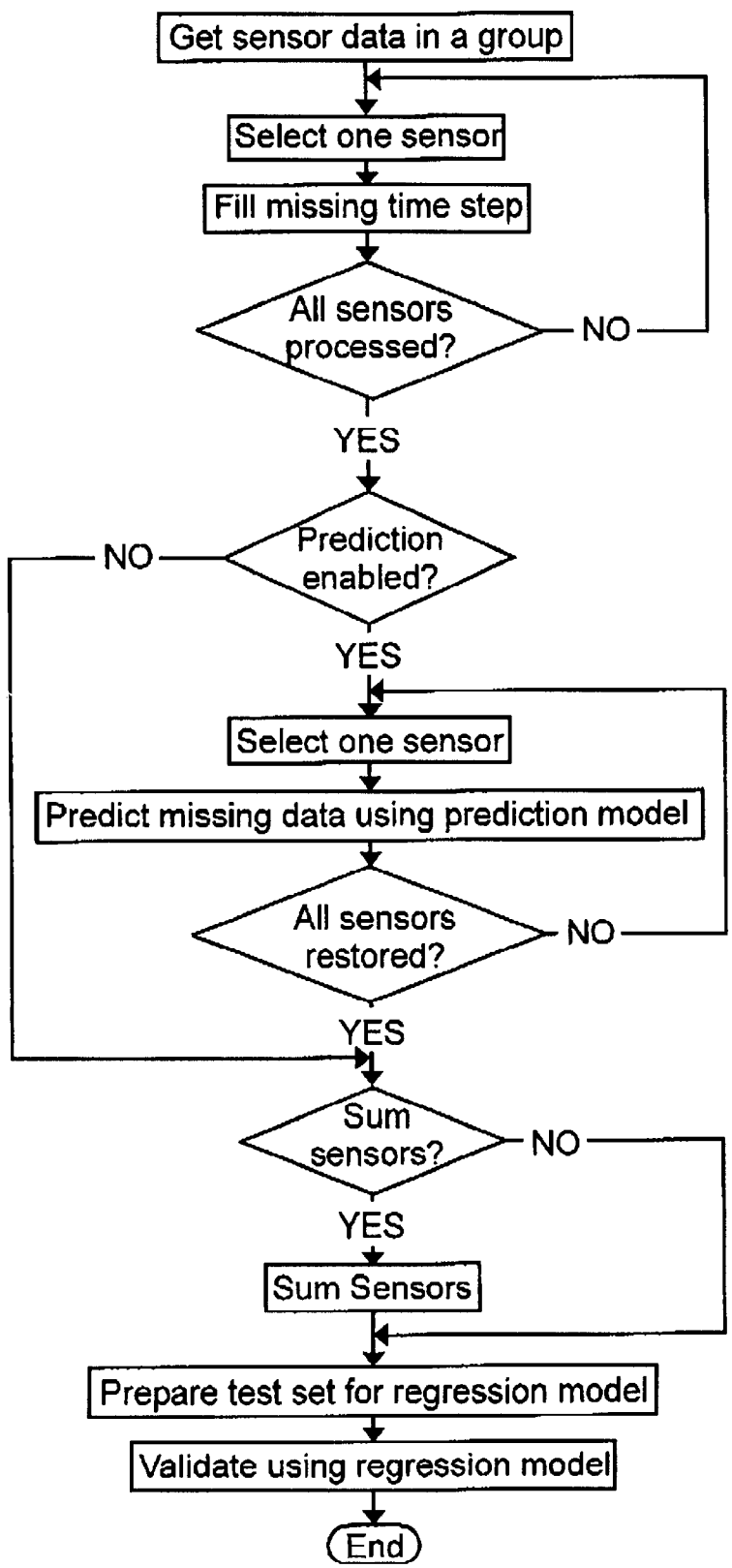
FIG. 5 is a flow chart diagram of a testing the pre-processing model according to the present invention.

Referring to FIG. 5, a flow chart diagram of a testing process according to the present invention is shown. Using gathered knowledge from the step of training, the neural network is executed for validating received sensor data. The sensor data used for testing are different from the sensor data that were used in the training process. Usually the sensor data to be validated are data that were acquired from known operational system components immediately after the training data in terms of time history. A test data for each sensor is taken to calculate a number of records in a specified time interval. Appropriate time steps are used to fill in missing time steps with values of missing data—in the present implementation, a value of −1 is used to represent missing values.

The prediction weight files, which are representative of the prediction model stored upon completion of the training process, are loaded. The prediction model is used to predict missing data for each sensor prior to using the sensors in the validation process by the regression model. The weights for each sensor, and the weight for each segment of sensors are loaded for use in executing the neural network prediction model to estimate missing data.

The weights from the regression model are loaded, then test data are provided to the network in order to execute the network regression model to get the outputs values.

Alternatively, if a sum sensor was checked during the training process, then the sensor data are summed as previously described and the validation is performed according to the summed data.

Using conventional statistical analysis methodology, calculation of residue, mean and standard deviation is performed for the data. A threshold is set using the statistical data and potentially erroneous data are detected or excluded by calculating a confidence factor. If erroneous data are detected, flags are set for the operator to indicate such.

Selection of sensors having statistical correlation is typically somewhat straightforward though the system has an ability to use less than perfectly grouped data. Alternatively, an automated system for selecting statistically correlated sensors is used such as a genetic algorithm or an expert system.

Because the neural network is capable of determining correlations between sensors through a process of training, the individual correlations or redundancies need not be analyzed and predicted by the operator. As such, a method and system according to the present invention is easier to use and to segment than known prior art methods.

Advantageously, the data mining process according to the invention provides a system that is executable as soon as it is installed and which does not necessitate a long training period for providing a most appropriate reaction to an event.

The operation of the neural network is based on the prediction and the regression models that are both trained. Therefore, data sent to the neural network have already been pre-processed.

Advantageously, using such a system provides enough confidence in the pre-processing that it allows for suggesting replacement data with a high degree of confidence. Based on the prediction and the regression models, when sensed data of some sensors are off a predictable model according to a regression obtained based on historical data, the model suggests for replacing the "off-line" value with a most probable value. An off value does not mean that the sensor has failed and has to be replaced.

Of course, if this is not an isolated occurrence, appropriate actions are taken.

Numerous other embodiments may be envisaged without departing from the spirit and scope of the invention.

What is claimed is:

1. A method of data sensor validation comprising the steps of:
   pre-processing data sensor from each sensor from a plurality of sensors for at least segmenting the data sensors into a plurality of groups, each group for grouping sensors for sensing highly relevant data one to another;
   providing the pre-processed data sensor to a correlation processor, the correlation processor for determining from pre-processed data sensor, pre-processed data that is other than correlated, the determination made in dependence upon redundant pre-processed data other than pre-processed data from two sensors for sensing an identical parameter; and,
   when pre-processed data that is other than correlated is detected, providing an indication to an operator that the sensor data is other than correlated.

2. A method according to claim 1, wherein the step of pre-processing data sensor comprises the steps of:
   generating a prediction model for each sensor from the plurality of sensors, the prediction model for forming input patterns and output patterns based upon sets of continuous sensed data;
   iteratively training the prediction model, the iteration performed when a pre-determined amount of data are sensed, the iteration performed until a pre-determined level is reached;
   generating a regression model for each sensor from the plurality of sensors, the regression model for forming input patterns and output patterns based upon sets of continuous sensed data;
   iteratively training the regression model, the iteration performed when a pre-determined amount of data are sensed, the iteration performed until a pre-determined level is reached; and,
   providing pre-processed data in dependence upon at least the regression model to the correlation processor.

3. A method according to claim 2 wherein the step of iteratively training the prediction model comprises the steps of:

creating connection weights; and storing the connection weights such that they are indicative of the prediction model.

4. A method according to claim 2, wherein the step of iteratively training the regression model comprises the steps of:

creating connection weights; and storing the connection weights such that they are indicative of the regression model.

5. A method according to claim 2, wherein the pre-determined level is when an acceptable minimum mean square error is achieved.

6. A method according to claim 2, wherein the pre-determined level is when a maximum pre-specified iteration is reached.

7. A method according to claim 1, wherein the step of segmenting the data sensors into a plurality of groups comprises the step of determining one of physical and statistical relationship between data sensors in dependence upon a dynamic data point.

8. A method of data sensor validation according to claim 7, wherein the step of segmenting the data sensors comprising the steps of:

sizing each group from the plurality of groups such that a size corresponds to a pre-determined number of sensor data within a predetermined period of time; and, performing a moving average of each group from the plurality of groups provided a group size is greater than twice the pre-determined number of sensor data within a predetermined period of time.

9. A method of data sensor validation according to claim 7, wherein the step of segmenting the data sensors into a plurality of groups comprises the step of generating an input pattern and an output pattern for each group of the plurality of groups, each of the input pattern and of the output pattern comprising continuous sets of sensor data.

10. A method of data sensor validation according to claim 9, wherein the step of generating an input pattern and an output pattern comprises the step of merging the input pattern and the output pattern from each group for forming a training input and output pattern for use with a prediction model.

11. A method of data sensor validation according to claim 7, wherein the correlation processor is coupled for receiving the pre-processed data and for processing the pre-processed data to determine a correlation between pre-processed data from each sensor within a same group; and, wherein the step of determining one of physical and statistical relationship comprises the step of performing training of the correlation processor based on a plurality of different segmentations of the plurality of data sensors to determine a significant grouping.

12. A method of data sensor validation according to claim 2, wherein the step of generating a prediction model comprises the step of filling in a missing value.

13. A method of data sensor validation according to claim 11, wherein the correlation processor is for processing correlations between different groups as well.

14. A method of data sensor validation according to claim 13, wherein the correlation processor is for processing correlations data immediately after the step of providing data transformed in dependence upon at least the regression model to the correlation processor.

15. A method according to claim 13, wherein the correlation processor is a neural network.

16. A method of data sensor validation according to claim 1, wherein the correlation processor is a neural network.

17. A method of data sensor validation according to claim 11, wherein the pre-processed data that is other than correlated is pre-processed data that represents a physical parameter that is inconsistent with other sensor data, the other sensor data received from data sensors segmented within a same group of data sensors.

18. A method of data sensor validation according to claim 17, wherein the pre-processed data that is other than correlated is pre-processed data that represents a physical parameter that is inconsistent with other pre-processed data, the other pre-processed data determined from data received from data sensors segmented within a different group of data sensors.

19. A method of data sensor validation according to claim 1, wherein the step of pre-processing data sensor from each sensor from a plurality of sensors comprising the step of suggesting a most probable data for use when data sensor are off a predictable range of data sensor according to data sensor from other sensors from the plurality of sensors.

20. A method of data sensor validation according to claim 17, wherein sensors are environmental sensors.

21. A method according to claim 20, wherein the environmental sensors include a hydrosensor for sensing information and providing data relating to at least one of waterflow and waterlevels.

22. A method according to claim 21, wherein the data is correlated for sensor validation in a water level control system including a plurality of dams and interconnected waterways.

23. A sensor for use in geographically remote sensor applications comprising:

a sensing circuitry for sensing data;

a transmitter for transmitting sensed data to a correlation processor, the correlation processor for determining from pre-processed sensed data, pre-processed data that is other than correlated, the determination made in dependence upon redundant pre-processed data other than pre-processed data from two sensors for sensing an identical parameter at an approximately same geographic location; and a wireless transceiver circuit for wirelessly determining a geographic location of the sensor, for transmitting the determined geographic location of the sensor to the correlation processor, and for transmitting the sensed data to the correlation processor for allowing the correlation processor to associate the received sensed data with the determined geographic location.

24. A sensor for use in geographically remote sensor applications according to claim 23, wherein the correlation processor is a neural network.

25. A sensor for use in geographically remote sensor applications according to claim 23 wherein data sensed by the sensor is environmental data.

26. A sensor for use in geographically remote sensor applications according to claim 25, wherein the environmental data sensed by a sensor is determined upon the geographical location of the sensor.

27. A sensor according to claim 23, wherein the environmental sensor is a hydrosensor for sensing information and providing data relating to at least one of waterflow and waterlevels.

28. A sensor according to claim 27, wherein the correlation processor is for sensor validation in a water level control system including a plurality of dams and interconnected waterways.

29. A sensor for use in geographically remote sensor applications according to claim 23, wherein the wireless transceiver circuit comprises a global positioning system for determining geographic location of the sensor according to coordinates receive from satellites.

30. A method of data sensor validation comprising the steps of:

pre-processing data sensor from each sensor from a plurality of sensors;

providing the pre-processed data sensor to a correlation processor, the correlation processor for determining from pre-processed data sensor, pre-processed data that is other than correlated, the determination made in dependence upon redundant pre-processed data other than pre-processed data from two sensors for sensing an identical parameter; and, when pre-processed data that is other than correlated is detected, providing an indication to an operator that the sensor data is other than correlated.

* * * * *